United States Patent
Ohkawa

(10) Patent No.: US 8,774,641 B2
(45) Date of Patent: Jul. 8, 2014

(54) COMMUNICATION METHOD USING THE ENTANGLED STATE

(76) Inventor: Narumi Ohkawa, Kuwana (JP)

( * ) Notice: Subject to any disclaimer, the term of this patent is extended or adjusted under 35 U.S.C. 154(b) by 246 days.

(21) Appl. No.: 13/506,380

(22) Filed: Apr. 17, 2012

(65) Prior Publication Data

US 2012/0237209 A1     Sep. 20, 2012

(51) Int. Cl.
*H04B 10/00* (2013.01)
*H04B 10/70* (2013.01)

(52) U.S. Cl.
CPC ........................... *H04B 10/70* (2013.01)
USPC ............. 398/140; 398/40; 398/152; 398/205; 398/212; 398/39; 380/255; 380/256; 380/270

(58) Field of Classification Search
CPC combination set(s) only.
See application file for complete search history.

(56) References Cited

U.S. PATENT DOCUMENTS

| | | | |
|---|---|---|---|
| 7,038,188 B2* | 5/2006 | Beausoleil et al. | 250/214.1 |
| 7,660,533 B1* | 2/2010 | Meyers et al. | 398/152 |
| 7,847,234 B2* | 12/2010 | Meyers et al. | 250/225 |
| 8,605,288 B2* | 12/2013 | Bennett et al. | 356/483 |
| 2003/0123516 A1* | 7/2003 | Steinberg et al. | 372/102 |
| 2003/0133714 A1* | 7/2003 | Gat | 398/140 |
| 2005/0259997 A1* | 11/2005 | Sternklar et al. | 398/186 |
| 2008/0085121 A1* | 4/2008 | Tomaru | 398/138 |
| 2009/0251703 A1* | 10/2009 | Edamatsu et al. | 356/460 |
| 2009/0268276 A1* | 10/2009 | Lee et al. | 359/330 |
| 2009/0317089 A1* | 12/2009 | Peters et al. | 398/173 |
| 2011/0075239 A1* | 3/2011 | Moiseev et al. | 359/241 |
| 2013/0308956 A1* | 11/2013 | Meyers et al. | 398/130 |

FOREIGN PATENT DOCUMENTS

JP    2010-252832 A1    5/2012

OTHER PUBLICATIONS

Kok et al: "Practical quantum repeaters with linear optics and double-photon guns", arXiv:quant-ph/0203134v1, Mar. 27, 2002, pp. 1-4.*
Matsuda et al: "Observation of optical-fiber Kerr nonlinearity at the single-photon level", Nature Photonics, 3, 95-98 (2009).*
Keiichi Edamatsu. et al. Observation of optical-fibre Kerr nonlinearity at the single-photon level. Nature Photonics 3, 95-98(2009) Above document shows a method of observation of phase modulation using Sagnac interferometer.
Baumberg, J. J. et al. Ultrafast Faraday spectroscopy in magnetic semiconductor quantum structures. Phys. Rev. B 50, 7689-7700 (1994). Above document shows "optical bridge" in p. 7691 and Fig. 3.

* cited by examiner

*Primary Examiner* — Li Liu

(57) ABSTRACT

The first photon in single-photon state is divided into two components by the half beam splitter, and the first component is sent to the sender while the second component is sent to the receiver. The sender measures the first component of the first photon when he sends "1". The sender doesn't measure the first component of the first photon when he sends "0". The receiver makes the second component of the first photon enter into the Sagnac interferometer, and the receiver also makes the reference light enter into the Sagnac interferometer at the same time. The receiver makes the second component of the first photon interact with the reference light in the nonlinear optical medium arranged in the Sagnac interferometer. The receiver knows the signal from the phase modulation of the reference light caused by the interaction with the second component of the first photon.

1 Claim, 2 Drawing Sheets

COMMUNICATION METHOD USING THE ENTANGLED STATE

FIELD

The embodiments discussed herein are related to a communication method using the entangled state, and a communication method using nonlinear refractive index effect.

BACKGROUND

For current communication technology, telecommunication or optical fiber communication has been widely used.

In the communication method that uses electricity or light, the signal transmission speed is limited below speed of light.

On the other hand, the quantum communication technology or quantum cryptography based on the principle of quantum mechanics is being actively researched.

Moreover, the quantum teleportation, reproducing a quantum state in another system, is also being researched using the entangled state.

In the quantum code or the quantum teleportation, the collapse of the wave packet (decoherence) is used. The collapse of the wave packet occurs instantly when measurement is done, and a strong correlation appears in each measurement result of each part in the entangled state.

However, it is said that it is not possible to use the entangled state to send information because an individual measurement result of the entangled state is quite random, and cannot arbitrarily choose the measurement result.

Therefore, even in the quantum code or the quantum teleportation, the communication process at the speed below speed of light is needed to actually send information. So the signal transmission speed becomes below speed of light.

Related references are as follows:
Japanese Patent Publication No. 2010-252832
Nature Photonics 3, 95-98 (2009)
Phys. Rev. B 50, 7689-7700 (1994)

SUMMARY

According to an aspect of the first embodiment, a communication method comprising: the step that the sender and the receiver prepare the first photon in the single-photon state; the step that the first photon is divided into two components by the half beam splitter, and the first component is sent to the sender while the second component is sent to the receiver; the step that the sender measures the first component of the first photon when he sends "1"; the step that the sender doesn't measure the first component of the first photon when he sends "0"; the step that the receiver makes the second component of the first photon enter into the Sagnac interferometer, and the receiver also makes the reference light enter into the Sagnac interferometer at the same time; the step that the receiver makes the second component of the first photon interact with one of the two components of the reference light in the nonlinear optical medium arranged in the Sagnac interferometer; the step that the receiver measures the phase modulation of the reference light caused by the interaction with the second component of the first photon.

DESCRIPTION OF EMBODIMENTS

Communication Method of the First Embodiment

Figure 1:
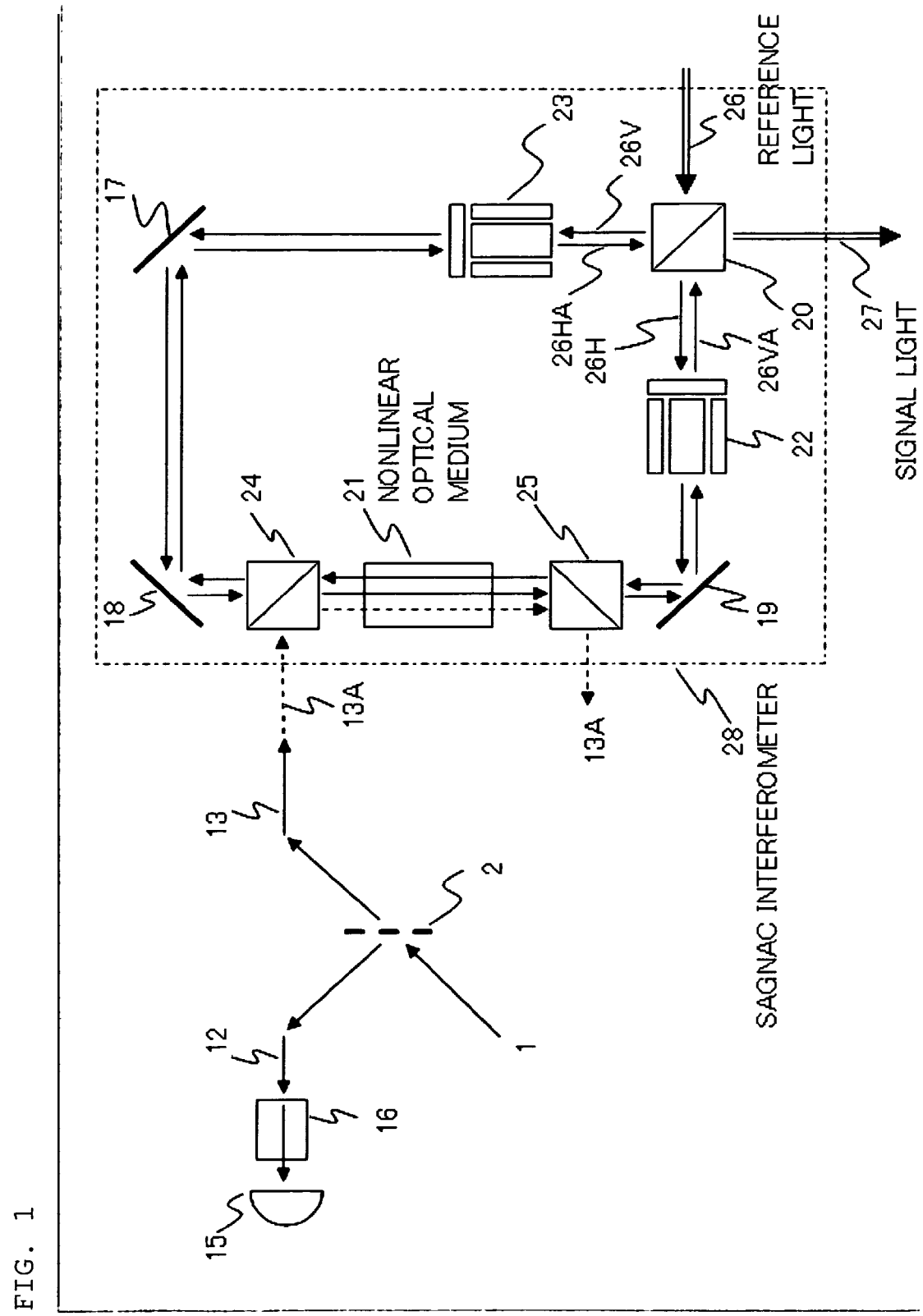
FIG. 1 is a schematic view of the instruments for the communication method of the first embodiment where the optical switch 16 is in the state that the light can pass.
Figure 2:
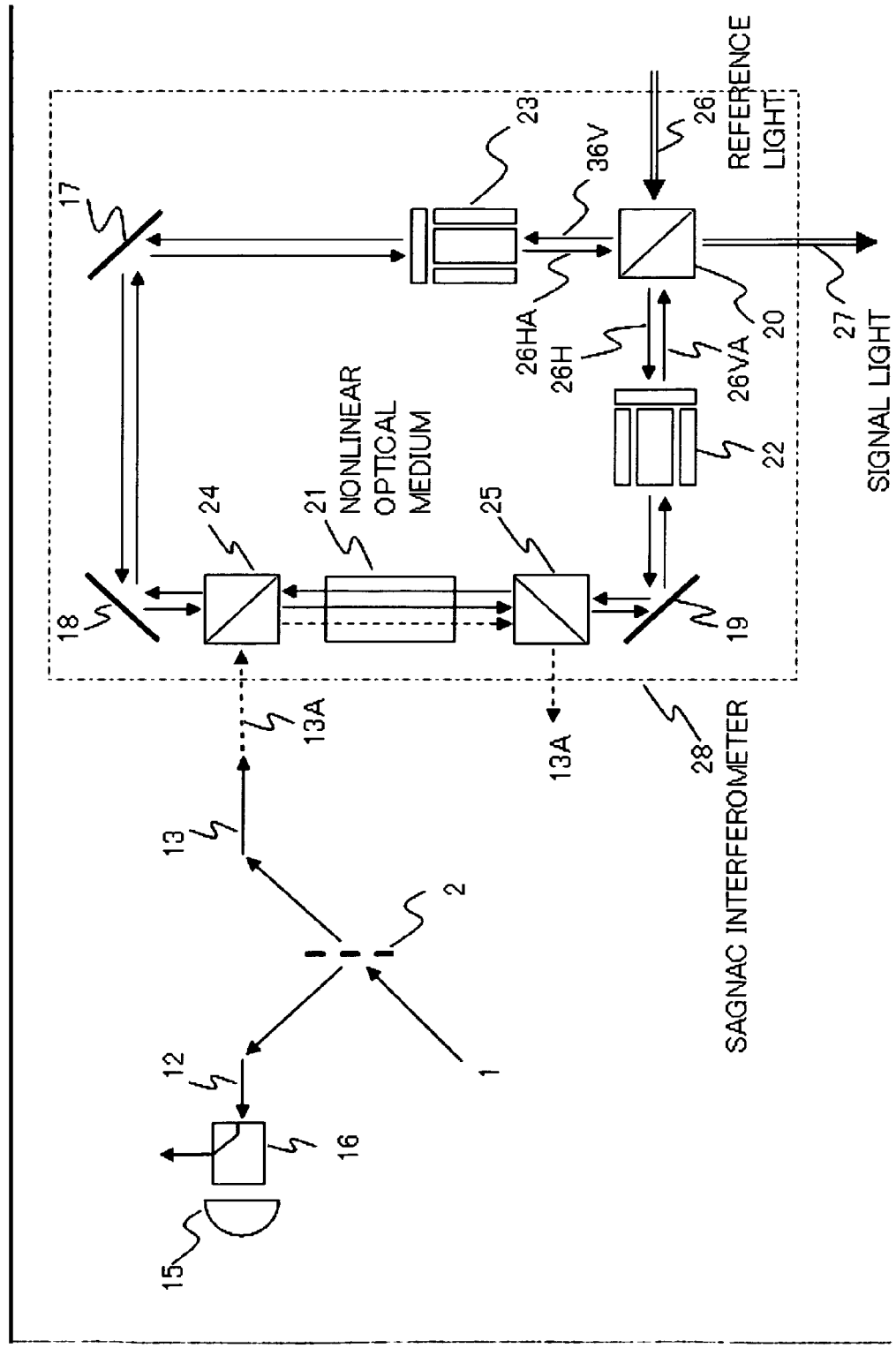
FIG. 2 is a schematic view of the instruments for the communication method of the first embodiment where the optical switch 16 is in the state that the light is averted.

A method for communication according to the present first embodiment will be described with reference to FIGS. 1 to 2. FIGS. 1 to 2 are schematic views of the instruments according to the first embodiment. The related reference is Japanese Patent Publication No. 2010-252832.

The first photon 1 in FIG. 1 in the single-photon state enters into half beam splitter 2. It is assumed that the first photon 1 is in the state of a vertical polarized light. In half beam splitter 2, the first photon 1 is divided into the first component 12 propagating to the left and the second component 13 propagating to the right. Here, the first component 12 and the second component 13 are in the entangled state.

In FIG. 1, the first component 12 of the first photon 1 is measured in the first detector 15. The optical switch 16 is arranged just in front of the first detector 15, and the optical switch 16 is in the state that the light can pass.

On the other hand, the second component 13 of the first photon 1 enters into Sagnac interferometer 28 after the first component 12 of the first photon 1 is measured at the first detector 15. The second component 13 of the first photon 1 after the first component 12 of the first photon 1 is measured in the first detector 15 is shown by a dotted line arrow 13A.

The Sagnac interferometer 28 is composed of mirror 17, mirror 18, mirror 19, polarization beam splitter 20, polarization beam splitter 24, polarization beam splitter 25, and the nonlinear optical medium 21, Faraday unit 22, and Faraday unit 23. The second component 13A of the first photon 1 enters into the Sagnac interferometer 28 from the polarization beam splitter 24 and pass the nonlinear optical medium 21 and gets out from the Sagnac interferometer 28 at the polarization beam splitter 25, because the second component 13A of the first photon 1 is in the state of the vertical polarized light.

Moreover, reference light 26 enters into the Sagnac interferometer 28 from the polarization beam splitter 20. The reference light 26 consists of the horizontal polarized light and the vertical polarized light, and it is in the state of $|H\rangle + |V\rangle$ before it enters into the Sagnac interferometer 28. Here $|H\rangle$ shows the state of the horizontal polarized light and $|V\rangle$ shows the state of the vertical polarized light. In FIG. 1, the reference light 26 in the Sagnac interferometer 28 is divided into the first component 26V and the second component 26H. The first component 26V of the reference light 26 propagates anti-clockwise in the Sagnac interferometer 28, and the second component 26H of the reference light 26 propagates clockwise in the Sagnac interferometer 28. Here, the first component 26V of the reference light 26 and the second component 26H of the reference light 26 can be set to propagate both in the state of the horizontal polarization in the section from Faraday unit 22 clockwise to Faraday unit 23, by converting the direction of the polarization at Faraday unit 22 or Faraday unit 23. The first component 26V of the reference light 26 propagates in the state of the vertical polarization in the section from Faraday unit 22 anti-clockwise to Faraday unit 23. The second component 26H of the reference light 26 propagates in the state of horizontal polarization in the section from Faraday unit anti-clockwise to Faraday unit 23. Therefore, the first component 26V of the reference light 26 and the second component 26H of the reference light 26 penetrate polarization beam splitter 24 and polarization beam splitter 25. In FIG. 1, 26VA shows the first component of the reference light 26 after it pass Faraday unit 22, and 26HA shows the second component of the reference light 26 after it pass Faraday unit 23. The first component 26VA of the reference light 26 and the second component 26HA of the reference light 26 are mixed at the polarization beam splitter 20, and get out from the Sagnac interferometer as the signal light 27. Above-mentioned Sagnac interferometer 28 is explained in detail in non-patent documents, Nature Photonics 3, 95-98 (2009).

The refractive index for the first component 26V of the reference light 26 changes in the nonlinear optical medium 21 proportional to the intensity of the second component 13A of the first photon 1. This is due to the nonlinear refractive index effect of the nonlinear optical medium 21, and it is called cross phase modulation (XPM). On the other hand, the refractive index for the second component 26H of the reference light 26 is unaffected because there is almost no time that the second component 26H of the reference light 26 interacts with the second component 13A of the first photon 1.

The wave function of the second component 13A of the first photon 1 and the reference light 26, before the measurement by the first detector 15 is done in FIG. 1, is expressed in the following Equation 1.

$$\Phi 0 = \frac{1}{\sqrt{2}}(|L\rangle + |R\rangle)(|H\rangle + |V\rangle) \quad \text{Equation 1}$$

Initial state Φ0 of the entire wave faction is shown by the product of the state of the reference light 26 (|H>+|V>) and the state of the first photon 1 (|L> ± |R> )/√2. Here |L> shows the first component 12 of the first photon 1, and |R> shows the second component 13 of the first photon 1. Therefore, |L> and |R> are in the entangled state. Moreover, (|H>+|V>) is the initial state of the reference light 26 where |H> is the horizontal polarization state and |V> is the vertical polarization state.

In the case that the first component 12 of the first photon 1 is not detected in the first detector 15 in FIG. 1, the state becomes as follows.

$$\Phi 1 |R\rangle(|H\rangle + |V\rangle) \quad \text{Equation 2}$$

From Equation 1 to Equation 2, the state of the first photon 1 changes from (|L> ± |R> )/√2 to |R>, because it is fixed that |L> doesn't exist by the measurement at the first detector 15. Next, the second component 13A of the first photon 1 enters into the Sagnac interferometer 28. The first component 26V of the reference light 26 receives the phase modulation by XPM caused by the intensity of the second component 13A of the first photon 1 in the nonlinear optical medium 21. The signal light 27 which gets out from Sagnac interferometer 28 is in the state Φ2 expressed by following Equation 3, where the amount of the phase modulation is assumed to be θ.

$$\Phi 2 = |R\rangle(|H\rangle + \exp(i\theta)|V\rangle) \quad \text{Equation 3}$$

Moreover, when the first component 12 of the first photon 1 is detected by the first detector 55, the state of the first photon 1 is fixed to |L>, and the state becomes Φ3 shown by following Equation 4.

$$\Phi 3 = |L\rangle(|H\rangle + |V\rangle) \quad \text{Equation 4}$$

In this case, because the second component 13A of the first photon 1 doesn't enter into the Sagnac interferometer 28, the signal light 27 which gets out from Sagnac interferometer 28 is in the state of Φ3.

The change of the state Φ0 into the state of Φ1 or Φ3 is called the collapse of the wave packet which occurs almost instantly at very short time by the measurement at the first detector 15.

Next, the case of FIG. 2 is explained. Optical switch 16 just in front of the first detector 15 is set to avert light up in FIG. 2 unlike the case of FIG. 1. Therefore, the measurement to the first component 12 of the first photon 1 is not done and the collapse of the wave packet doesn't occur. Therefore, the second component 13A of the first photon 1 enters into Sagnac interferometer 28, while the second component 13A of the first photon 1 is in the state of |R> /√2. The first component 26V of the reference light 26 receives the phase modulation in the Sagnac interferometer 28 by XPM caused by the second component 13A of the first photon 1. And the amount of the phase modulation becomes θ/2 for FIG. 2. The factor 1/2 comes from the intensity of the second component 13A of the first photon 1 in the state of |R> /√2. Therefore, signal light 27 is in the state Φ4 shown by the following Equation 5.

$$\Phi 4 = \frac{1}{\sqrt{2}}|L\rangle(|H\rangle + |V\rangle) + \frac{1}{\sqrt{2}}|R\rangle(|H\rangle + \exp(i\theta/2)|V\rangle). \quad \text{Equation 5}$$

In this case, the collapse of the wave packet occurs when the value of the phase modulation of the signal light 27 is measured. Then the phase modulation is 0 or θ/2.

In the case of FIG. 1, the signal light 27 which gets out from Sagnac interferometer 28 is in the state |H>+|V> or |H>+exp(iθ)|V>. So, the amount of the phase modulation of the signal light 27 is 0 or θ. In the case of FIG. 2, the signal light 27 which gets out from Sagnac interferometer 28 is in the state of |H>+|V> or |H>+exp(iθ/2)|V>. So, the amount of the phase modulation of the signal light 27 is 0 or θ/2. These amount of the phase modulation 0 or θ or θ/2 can be detected as a slight difference of polarization angle of signal light by using the technique that is called an optical bridge technique as explained in detail in non-patent documents, Nature Photonics 3, 95-98 (2009) and Phys. Rev. B 50, 7689-7700 (1994). Therefore, the case of FIG. 1 and the case of FIG. 2 can be distinguished.

In above discussion, the difference between the amount of the phase modulation θ and θ/2 comes from the change of the wave function (collapse of the wave packet) by the measurement at the first detector 15. The collapse of the wave packet is a basic concept of the Copenhagen interpretation of the quantum mechanics. So this method also shows the method to observe the collapse of the wave packet.

A method of communication using the above-mentioned composition is explained here. The sender and the receiver prepare the first photon 1 in the single-photon state. And, the first photon 1 is divided into two components by half beam splitter 2, the first component 12 of the first photon 1 is sent to the sender, and the second component 13 of the first photon 1 is sent to the receiver.

Optical switch 16 arranged just in front of the first detector 15 is in the state that the light can pass, and the sender measures the first component 12 of the first photon 1 when he transmits "1" at time 1. Moreover, when he transmits "0", light is prevented from advancing to the first detector 15 by optical switch 16, and the sender doesn't measure the first component 12 of the first photon 1.

The receiver makes the second component 13A of the first photon 1 enter into the Sagnac interferometer 28 at the time 2 after the time 1. The reference light 26 enters into the Sagnac interferometer 28 at the same time. A nonlinear optical medium 21 is arranged in a part of the Sagnac interferometer 28. The receiver makes the second component 13A of the first photon 1 interact with the first component 26V of the reference light 26, one of the two components of the reference light 26, in the nonlinear optical medium 21. As a result, the phase modulation proportional to the intensity of the second component 13A of the first photon 1 is caused in the signal light 27 which gets out from the Sagnac interferometer 28.

The receiver measures the phase modulation of the signal light 27. And the receiver knows that the signal is 1 in the case that the phase modulation is θ. Moreover, the receiver knows that the signal is 0 in the case that the phase modulation is θ/2. When the detected phase modulation is 0, the receiver can not know the signal. But by repeating above sequence, the receiver can distinguish the signal with enough accuracy because the phase modulation isn't 0 with 1/2 probability.

In the above-mentioned method, two selections whether the sender measures the first component 12 of the first photon 1 or not are used for communication. Because the measurement result is not used to transmit the information, the randomness of measurement result doesn't matter.

The collapse of the wave packet (decoherence) by the measurement is assumed to occur almost instantly at very short time. Therefore, the signal transmission speed beyond speed of light can be achieved in principle.

The Sagnac interferometer 28 can be also composed of the optical fiber instead of using the mirrors, as explained in Nature Photonics 3, 95-98 (2009).

What is claimed is:

1. A method for communication comprising;

a first step that a sender and a receiver prepare a first photon in a single-photon state, and the first photon is divided into two components by a half beam splitter, and the first component is sent to the sender, and the second component is sent to the receiver;

a second step that the sender measures the first component of the first photon when the sender sends a signal "1", while the sender does not measure the first component of the first photon using an optical switch to prevent measurement of the first component of the first photon when the sender sends a signal "0";

a third step that the receiver makes the second component of the first photon to get into a Sagnac interferometer in which a nonlinear optical medium is arranged and a reference light is propagating clockwise and counter-clockwise, and the receiver makes the second component of the first photon to interact with the reference light using cross phase modulation in the nonlinear optical medium, where the third step is executed after the second step is completed;

a forth step that the receiver measures a phase modulation of the reference light caused by the interaction with the second component of the first photon using optical bridge technic a fifth step that the receiver knows that the signal is "1" when the phase modulation of the reference light is a first value which isn't zero, while the receiver knows that the signal is "0" when the phase modulation of the reference light is half the first value, where the fifth step is executed after a sequence from the first step to the forth step is repeated multiple times.

* * * * *